(12) United States Patent
Yu et al.

(10) Patent No.: US 7,744,391 B2
(45) Date of Patent: Jun. 29, 2010

(54) MEMORY CARD CONNECTOR WITH IMPROVED SLIDING STRUCTURE TO REDUCE FRICTION

(75) Inventors: Jian-Fei Yu, Kunshan (CN); Qi-Jun Zhao, Kunshan (CN); Hua Yin, Kunshan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/380,683

(22) Filed: Mar. 2, 2009

(65) Prior Publication Data

US 2009/0221168 A1 Sep. 3, 2009

(30) Foreign Application Priority Data

Feb. 29, 2008 (CN) .......................... 2008 2 0032406

(51) Int. Cl.
*H01R 13/62* (2006.01)
(52) U.S. Cl. ...................................................... 439/159
(58) Field of Classification Search ................. 439/159, 439/630, 638
See application file for complete search history.

(56) References Cited

U.S. PATENT DOCUMENTS

| | | | | |
|---|---|---|---|---|
| 6,394,827 B2 * | 5/2002 | Nogami | ....................... | 439/159 |
| 6,746,280 B1 * | 6/2004 | Lu et al. | ...................... | 439/630 |
| 6,802,726 B2 * | 10/2004 | Chang | ......................... | 439/159 |
| 6,814,596 B2 | 11/2004 | Yu et al. | | |
| 6,976,880 B1 * | 12/2005 | Chi-te et al. | ................. | 439/630 |
| 7,229,299 B2 * | 6/2007 | Katayanagi et al. | ........... | 439/95 |
| 7,261,577 B1 * | 8/2007 | Lai | .............................. | 439/159 |
| 2004/0014342 A1 * | 1/2004 | Yu et al. | ...................... | 439/159 |
| 2006/0134954 A1 * | 6/2006 | Xu et al. | ...................... | 439/159 |

* cited by examiner

*Primary Examiner*—Neil Abrams
*Assistant Examiner*—Harshad C Patel
(74) *Attorney, Agent, or Firm*—Wei Te Chung; Andrew C. Cheng; Ming Chieh Chang

(57) ABSTRACT

A memory card connector includes an insulative housing, a plurality of contacts retained in the insulative housing, a card eject mechanism and metal shell attached to the insulative housing. The insulative housing defines a card receiving cavity for insertion of a memory card. The card eject mechanism includes a slider moveable along card-insertion or card-withdraw directions and a locking member fixed to the slider. The locking member includes a protrusion which forms a sideward dimple. The metal shell includes a top wall covering the card receiving cavity. The top wall defines a slit for receiving the protrusion. An arced surface of the dimple is driven to abut against an inner side of the slit in order to reduce friction therebetween.

18 Claims, 8 Drawing Sheets

MEMORY CARD CONNECTOR WITH IMPROVED SLIDING STRUCTURE TO REDUCE FRICTION

BACKGROUND OF THE INVENTION

1. Field of the Invention

This invention generally relates to a memory card connector, and more particularly to a memory card connector with improved sliding structure to reduce friction.

2. Description of the Prior Art

U.S. Pat. No. 6,814,596 B2 discloses a conventional memory card connector mounted in an electronic device for insertion of a corresponding memory card. The memory card connector includes an insulative housing defining a card receiving cavity, a plurality of contacts retained in the insulative housing, an eject mechanism mounted on the insulative housing and a metal shell covering the card receiving cavity. The metal shell includes first and second guiding slits parallel with each other. The eject mechanism includes a slider moveable along a front-to-back direction and a locking piece fixed to the slider. The locking piece includes an upwardly plate-shaped extension which is selectively moveable in the first or the second guiding slits. However, take the first guiding slit for example, when the memory card connector is of long-time usage, there may be a small angle between the first guiding slit and the extension. Under this condition, a serious friction occurs between the first guiding slit and the extension to produce small metal chips. The terrible metal chips may make a short circuit between two conductive members, such as two contacts. As a result, the electronic device may be broken.

Hence, it is desired to have a memory card connector solving the problem above.

BRIEF SUMMARY OF THE INVENTION

A memory card connector includes an insulative housing, a plurality of contacts retained in the insulative housing, a card eject mechanism and metal shell attached to the insulative housing. The insulative housing defines a card receiving cavity for insertion of a memory card. Each contact includes a contact portion protruding into the card receiving cavity. The card eject mechanism includes a slider moveable along card-insertion or card-withdraw directions and a locking member fixed to the slider. The locking member includes a protrusion which forms a sideward dimple. The metal shell includes a top wall covering the card receiving cavity. The top wall defines a slit for receiving the protrusion. An arced surface of the dimple is driven to abut against an inner side of the slit in order to reduce friction therebetween.

Other objects, advantages and novel features of the invention will become more apparent from the following detailed description of the present embodiment when taken in conjunction with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE INVENTION

Reference will now be made in detail to the preferred embodiment of the present invention.

Figure 8:
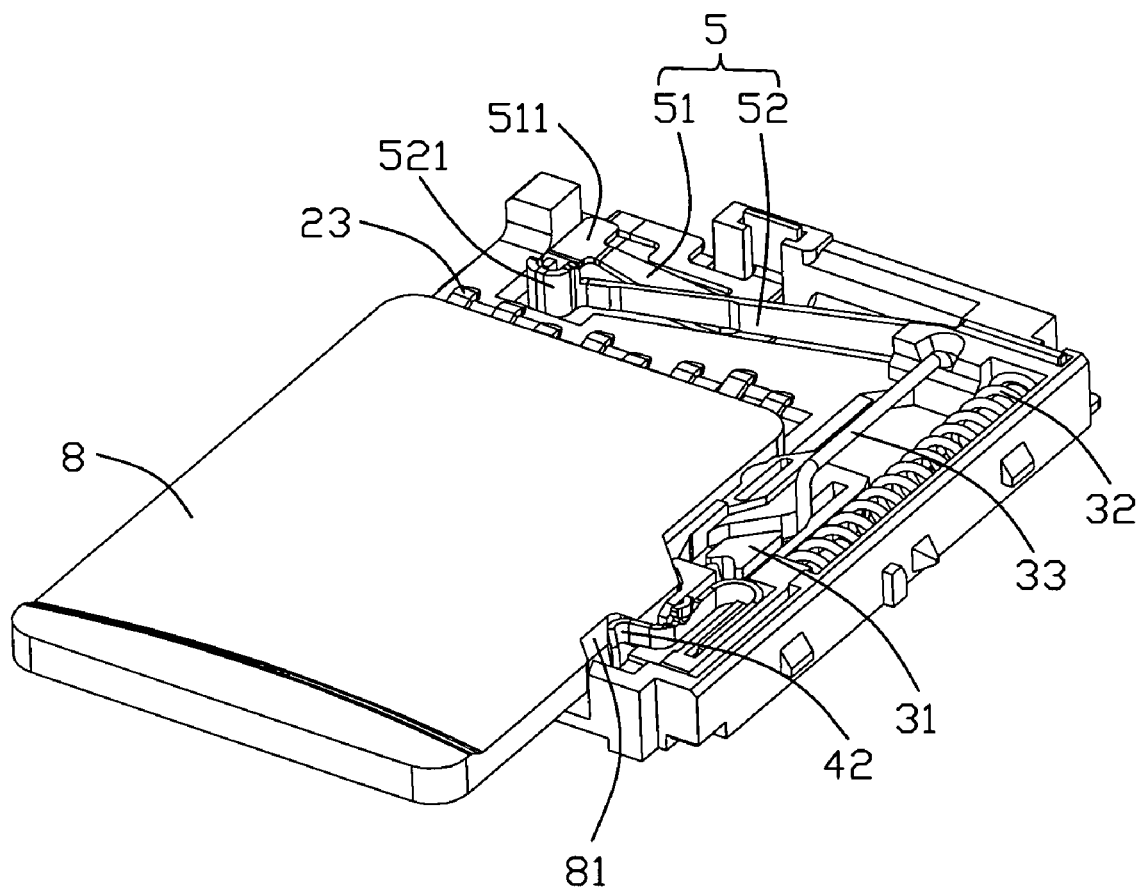
FIG. 8 is a perspective view of the memory card connector with a memory card inserted thereinto, but with the metal shell removed therefrom.

Referring to FIGS. 1 to 4, a memory card connector 100 for receiving a memory card 8 comprises an insulative housing 1, a plurality of contacts 2, a card eject mechanism 3, a pair of switch contacts 5 retained in the insulative housing 1 and a metal shell 6 attached to the insulative housing 1. In the preferred embodiment, the memory card connector 100 is a MicroSD card connector for receiving a corresponding MicroSD card 8 as shown in FIG. 8.

The insulative housing 1 includes a bottom wall 11, an insertion opening 12, a side wall 13 upwardly extending from the bottom wall 11, and a rear wall 14 opposite to the insertion opening 12. The bottom wall 11 defines a plurality of passageways 110 for retaining the contacts 2. The side wall 13 defines a depression 131 for accommodating the card eject mechanism 3, a position hole 132 behind the depression 131 and a first mounting post 133 forwardly extending into the depression 131. Besides, the insulative housing 1 defines a card receiving cavity 10 extending through the insertion opening 12 for receiving the memory card 8.

Figure 5:
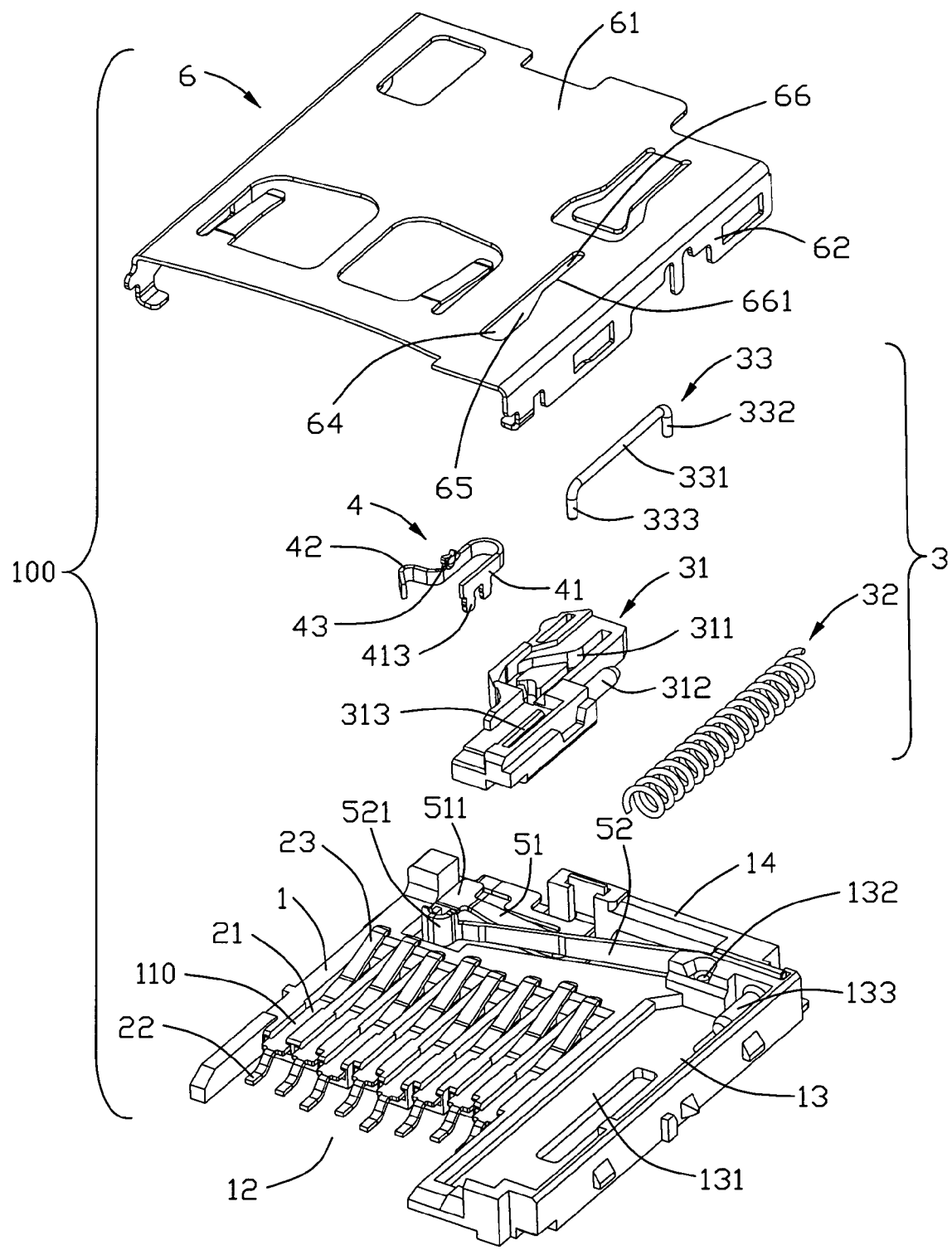
FIG. 5 is an exploded view of the memory card connector.
Figure 6:
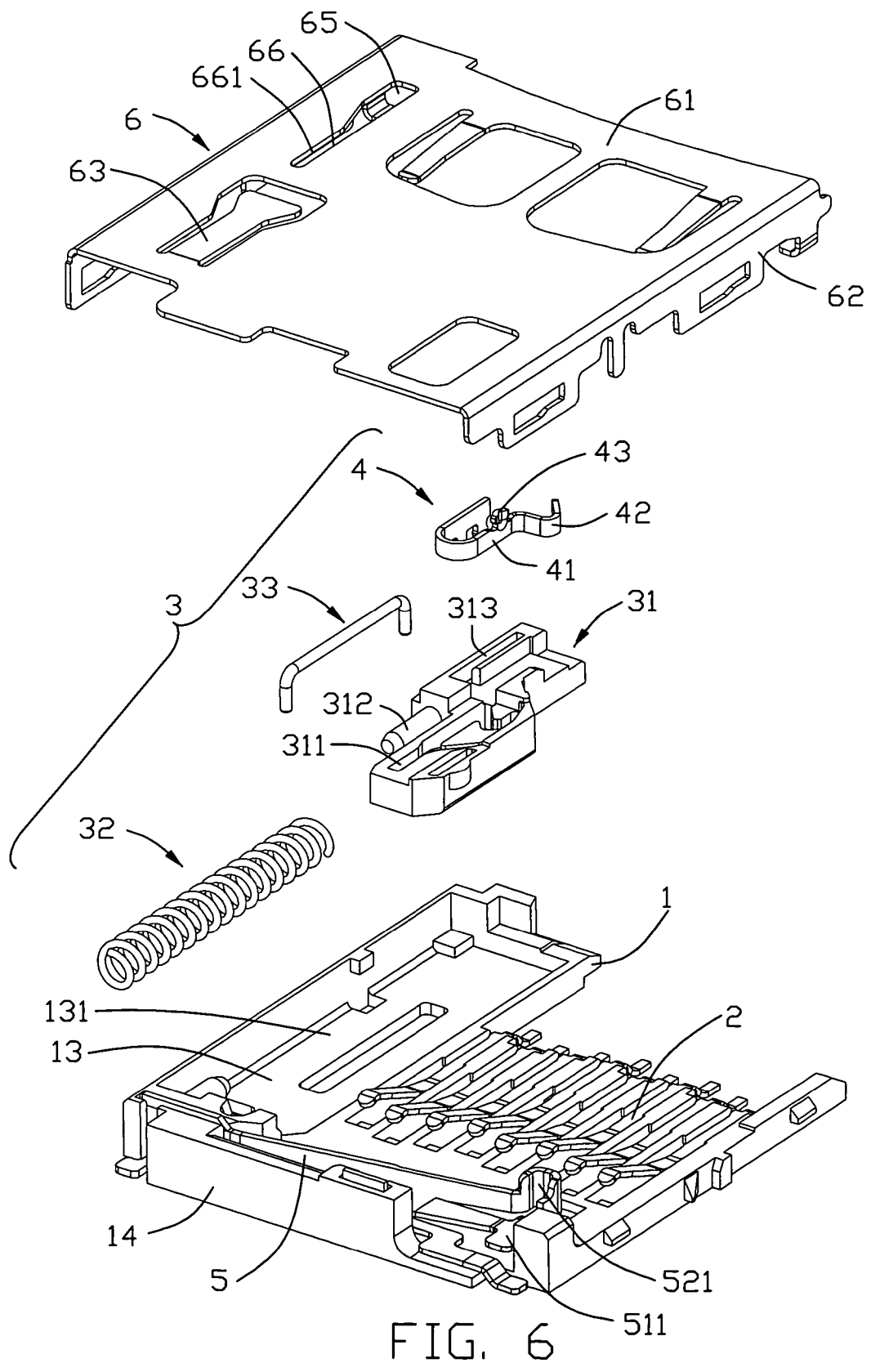
FIG. 6 is another exploded view of the memory card connector similar to FIG. 5, but viewed from another aspect.

Referring to FIGS. 5 and 6, each contact 2 includes a base 21 retained in the passageways 110, a contact portion 23 extending from one end of the base 21 and a tail portion 22 extending from the other end of the base 21. The contact portion 23 cantileveredly extends into the card receiving cavity 10 for abutting against the memory card 8.

Figure 7:
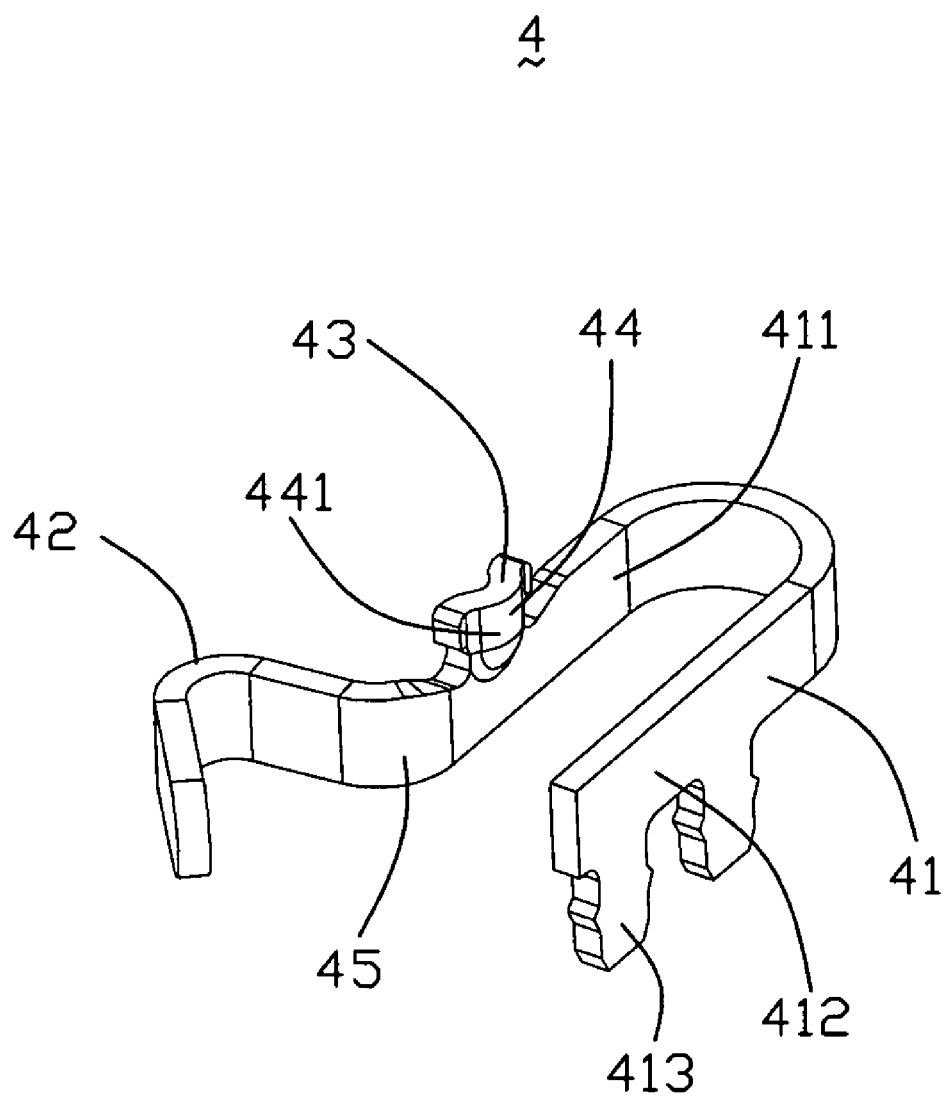
FIG. 7 is an enlarged, perspective view of a spring member.

Referring to FIGS. 3 to 8, the card eject mechanism 3 comprises a slider 31 moveable in the depression 131, a coiled spring 32 abutting against the slider 31, and a link rod 33 for controlling positions of the slider 31. The slider 31 includes a heart-shaped cam 311 recessed from a top face thereof and a second mounting post 312 adjacent to the heart-shaped cam 311, and a slit 313 at the front of the second mounting post 312. Referring to FIG. 7, the card eject mechanism 3 further includes a metal locking member 4 fixed in the slit 313. The locking member 4 includes a U-shaped retaining portion 41, a spring arm 45 extending forwardly from the retaining portion 41 and a protrusion 43 upwardly extending from the retaining portion 41. The retaining portion 41 includes opposite first and second sides 411, 412. The spring arm 45 extends from the first side 411 with the protrusion 43 disposed between the first side 411 and the spring arm 45. The retaining portion 41 further includes a pair of fastening portions 413 extending downwardly from the second side 412 to be fixed in the slider 31. The spring arm 45 includes a hook 42 protruding to the card receiving cavity 10 for locking the memory card 8. The protrusion 43 is sidewardly stamped to form a dimple 44 towards the second side 412. The dimple 44 has an arced surface 441 which will be detailed hereinafter.

The coiled spring 32 gives the slider 31 elastic force to realize ejecting the memory card 8 from the memory card connector 100. The coiled spring 32 is assembled between the first and second mounting posts 133, 312.

The link rod 33 includes a middle portion 331, a first hook 332 and a second hook 333 downwardly bending from opposite ends of the middle portion 331. The first hook 332 is inserted into the position hole 132 of the insulative housing 1 for retaining purpose. The second hook 333 is moveable in the heart-shaped cam 311. The memory card connector 100 is so-called push-push type card connector and the working theory of the card eject mechanism 3 is obvious to those of ordinary skill in the art, so the detailed description is omitted hereinafter.

Figure 1:
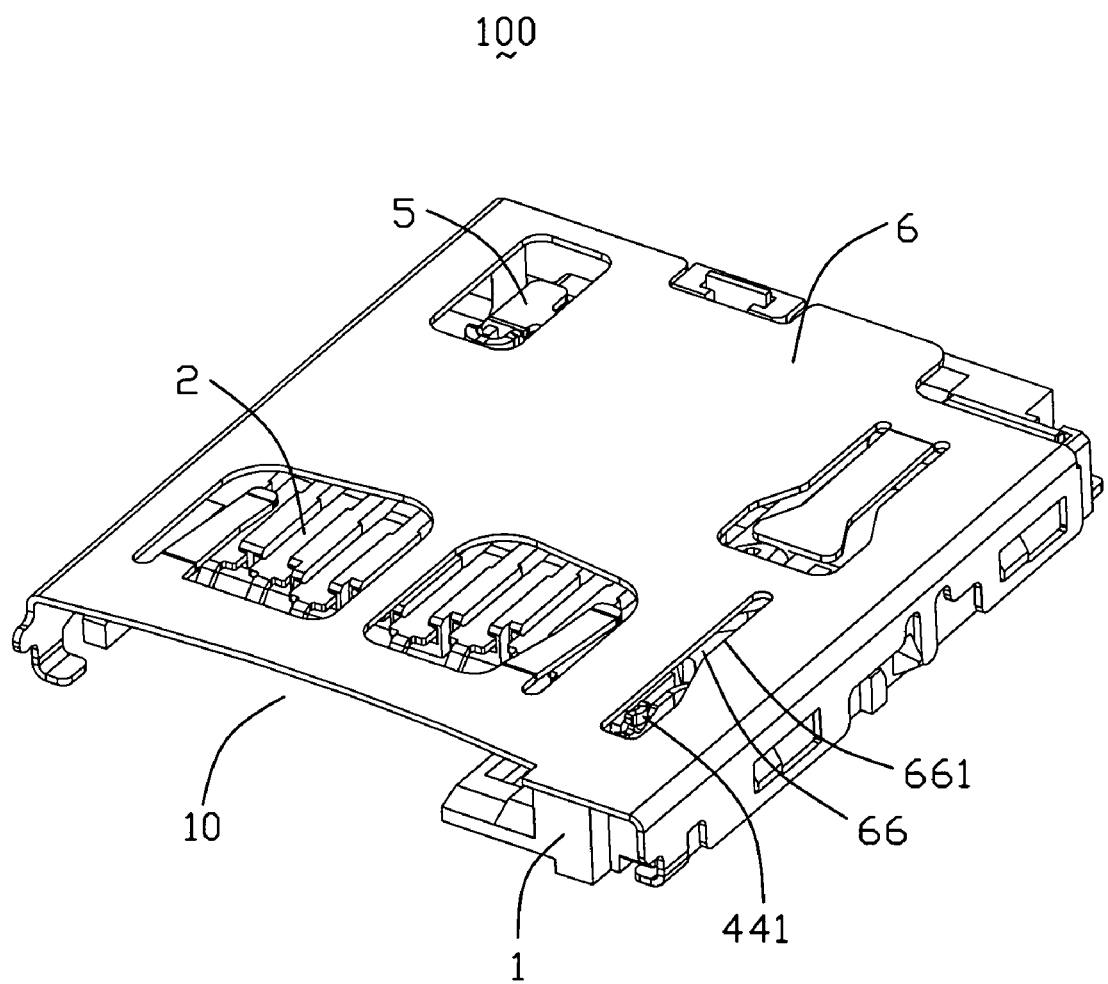
FIG. 1 is a front, perspective view of a memory card connector according to the preferred embodiment of the present invention.
Figure 2:
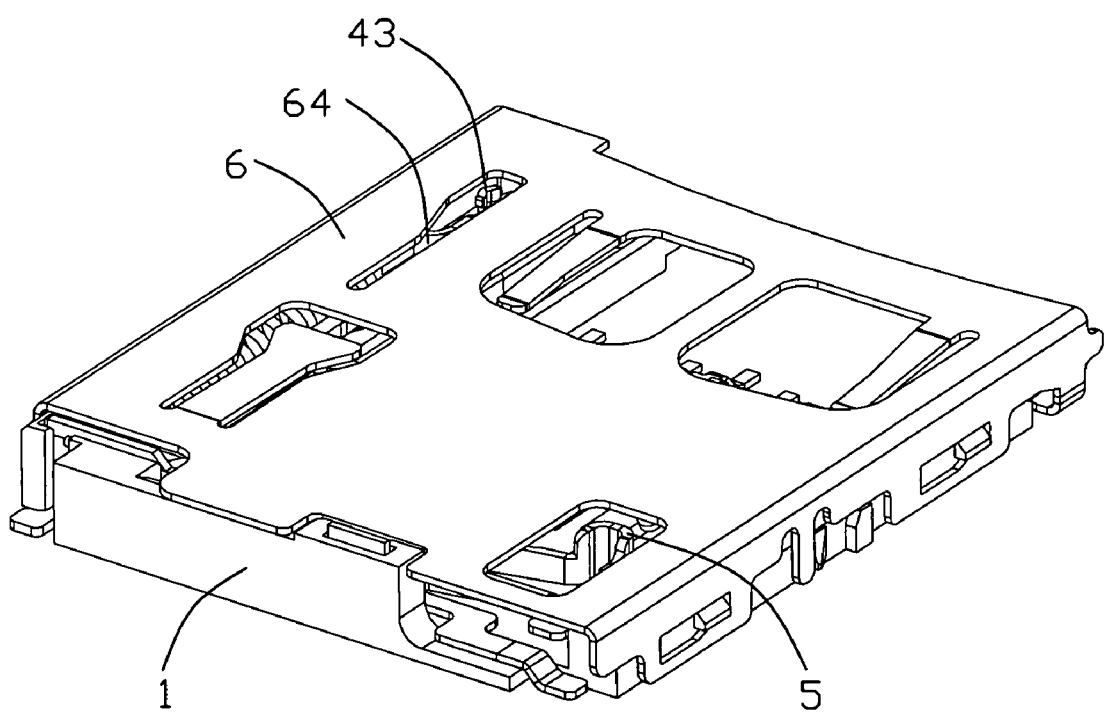
FIG. 2 is a perspective view of the memory card connector similar to FIG. 1, but viewed from another aspect.
Figure 3:
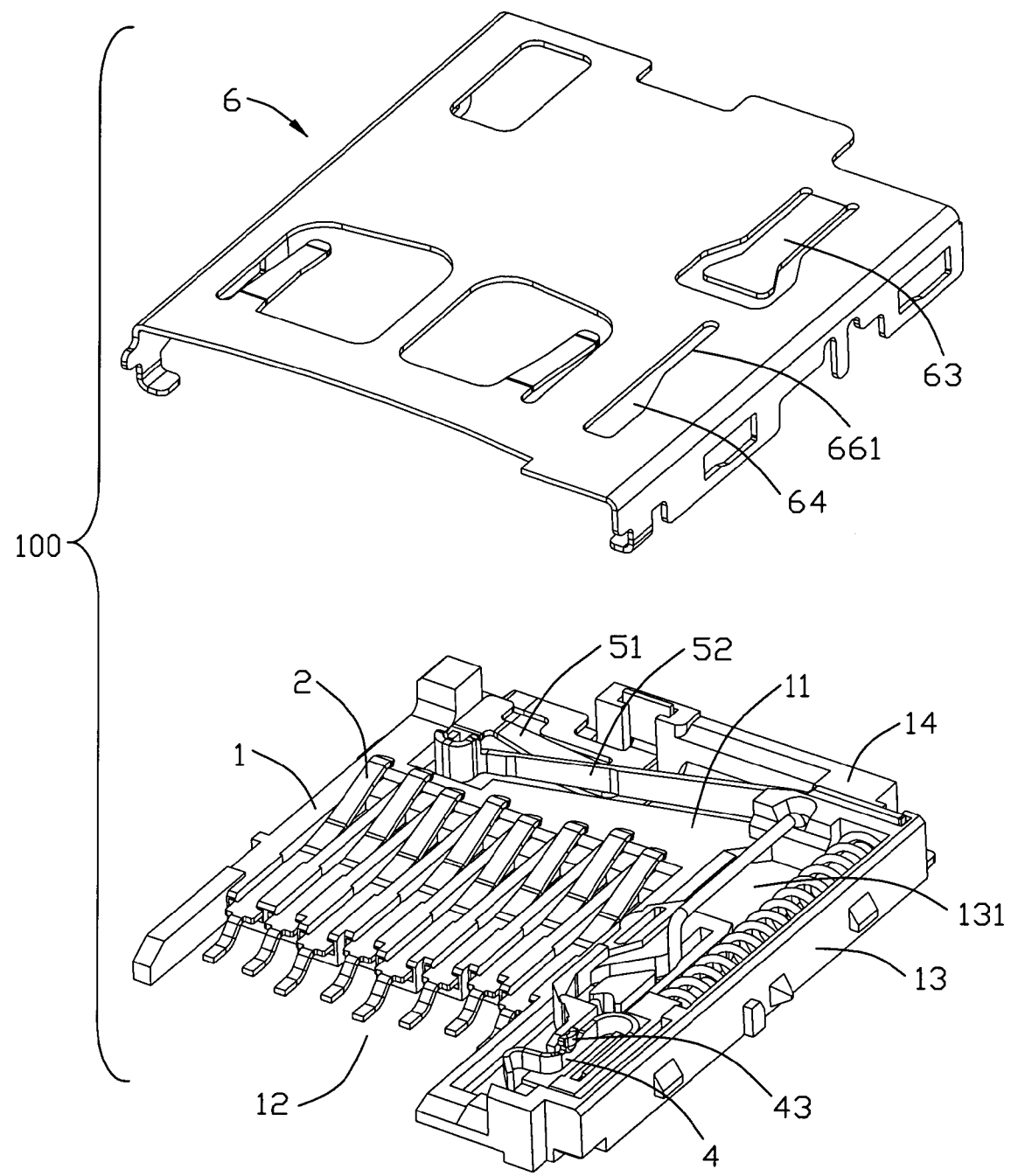
FIG. 3 is a partly exploded view of the memory card connector with a metal shell detached therefrom.
Figure 4:
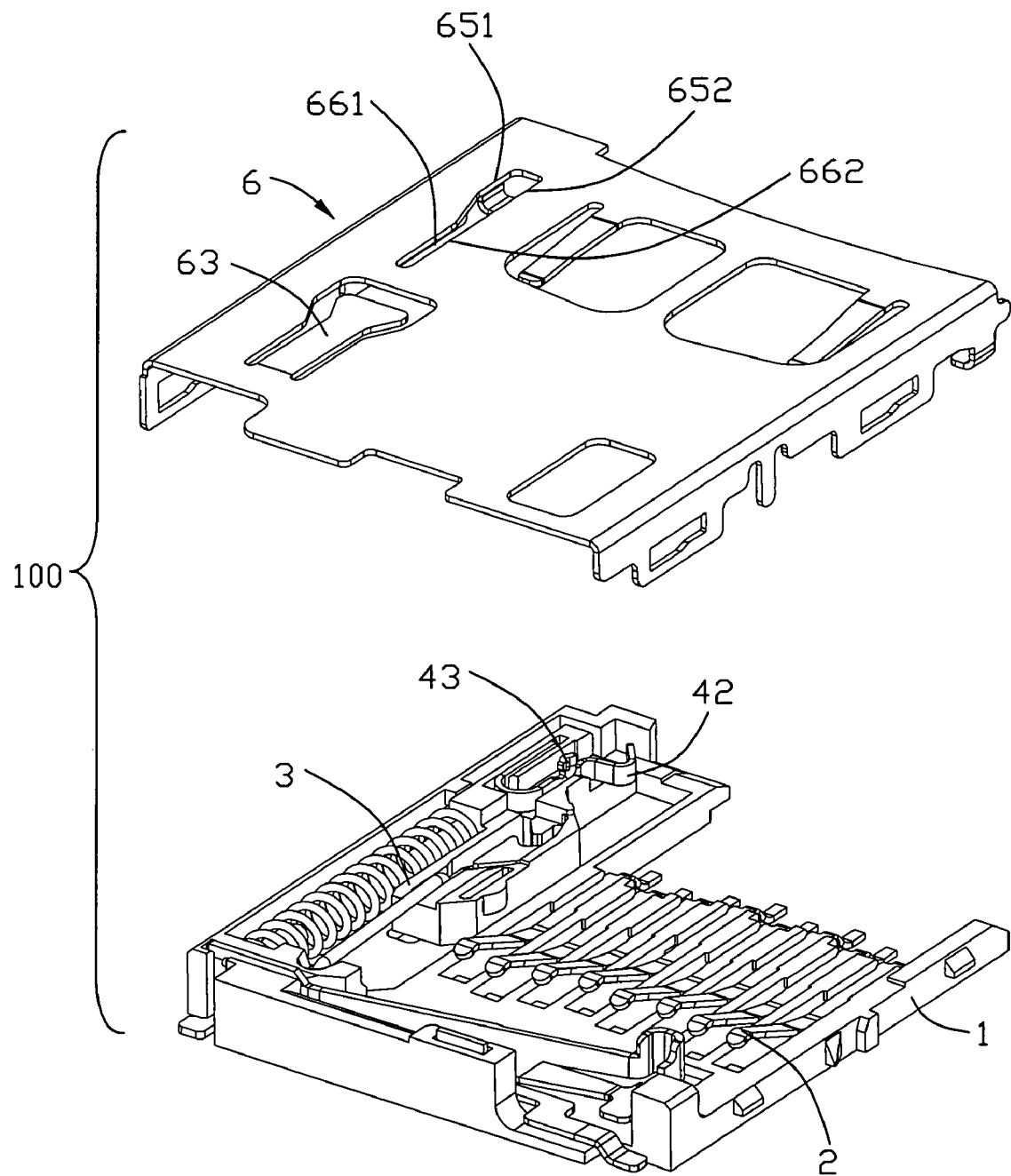
FIG. 4 is another partly exploded view of the memory card connector similar to FIG. 3, but viewed from another aspect.

Referring to FIGS. 3 to 5, the pair of switch contacts 5 are mounted at the rear wall 14 of the insulative housing 1 and located at a rear of the card receiving cavity 10. The switch contacts 5 include a first switch contact 51 and a second switch contact 52. The first switch contact 51 includes a first contact portion 511 and the second switch contact 52 includes a second contact portion 521 in condition that the first and the second contact portions 511, 521 can be selectively on/off determined by the insertion position of the memory card 8.

The metal shell 6 includes a top wall 61 and a pair of side walls 62 bending from lateral edges of the top wall 61. The top wall 61 includes a spring tab 63 for pressing the middle portion 331, of the link rod 33 to prevent it from falling out, and a slit 64 at a front of the spring tab 63. The protrusion 43 is moveable in the slit 64 when the memory card 8 is inserted into or ejects from the card receiving cavity 10. The slit 64 includes a first part 65 and a contracted second part 66 communicating with each other. The first part 65 includes opposite first and second edges 651, 652 and the second part 66 includes opposite third and fourth edges 661, 662 under a condition that the second and the fourth edges 652, 662 are arranged in a single line along a front-to-back direction.

Referring to FIG. 8, in use, when the memory card 8 is inserted into the card receiving cavity 10 through the insertion opening 12, the slider 31 is driven by the memory card 8 to move along the front-to-back direction. The hook 42 is recessed into a side opening 81 of the memory card 8 in order to lock the memory card. The arced surface 441 of the dimple 44 is apart from the first edge 651 in initial position. The arced surface 441 is driven by the memory card 8 to abut against the third edge 661 of the second part 66 in order to reduce friction therebetween. As a result, no metal chip occurs under this sliding structure.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. A memory card connector, comprising:
   an insulative housing defining a card receiving cavity for insertion of a memory card;
   a plurality of contacts retained in the insulative housing with contact portions protruding into the card receiving cavity;
   a card eject mechanism comprising a slider moveable along card-insertion or card-withdraw directions and a locking member fixed to the slider, the locking member comprising a protrusion which forms a sideward dimple; and
   a metal shell attached to the insulative housing and comprising a top wall covering the card receiving cavity, the top wall defining a slit for receiving the protrusion, wherein
   an arced surface of the dimple is driven to abut against an inner side of the slit with insertion of the memory card into the card receiving cavity.

2. The memory card connector according to claim 1, wherein the slit includes a first part and a contracted second part communicating with each other, and wherein the inner side is located at the second part.

3. The memory card connector according to claim 1, wherein the locking member comprises a retaining portion fixed to the slider and a spring arm extending from the retaining portion, the spring arm comprising a hook protruding into the card receiving cavity for locking the memory card.

4. The memory card connector according to claim 3, wherein the protrusion extends upwardly from the retaining portion.

5. The memory card connector according to claim 3, wherein the retaining portion is U-shaped and comprises opposite first and second sides, the spring arm extending from the first side with the protrusion located between the first side and the spring arm.

6. The memory card connector according to claim 5, wherein the dimple protrudes towards the second side of the retaining portion.

7. The memory card connector according to claim 6, wherein the retaining portion comprises at least one fastening portion extending downwardly from the second side to be fixed in the slider.

8. The memory card connector according to claim 1, wherein the card eject mechanism comprises a coiled spring and a link rod, the coiled spring comprising one end abutting against the slider and the other end abutting against the insulative housing, and the link rod comprising one hook retained in the insulative housing and the other hook movable in a heart-shaped cam formed in the slider.

9. The memory card connector according to claim 8, wherein the top wall of the metal shell comprises a spring tab pressing the link rod under a condition that the spring tab is located behind the slit.

10. The memory card connector according to claim 1, wherein the locking member is made of metal material and the dimple is stamped from the protrusion.

11. A push-push type memory card connector, comprising:
    an insulative housing defining a card receiving cavity for insertion of a memory card;
    a plurality of contacts retained in the insulative housing with contact portions protruding into the card receiving cavity;
    a card eject mechanism comprising a slider and a locking member fixed to the slider, the locking member comprising a protrusion which is sidewardly stamped to form a dimple; and
    a metal shell attached to the insulative housing and comprising a top wall covering the card receiving cavity, the top wall defining a slit for the protrusion moveable therein; wherein
    the silt includes a first part and a contracted second part communicating with each other, the first part comprising opposite first and second edges and the second part comprising opposite third and fourth edges under a condition that the second and the fourth edges are arranged in a single line, and wherein an arced surface of the dimple is driven to abut against the third edge with insertion of the memory card into the card receiving cavity.

12. The push-push type memory card connector according to claim 11, wherein the arced surface is driven to abut against only the third edge.

13. The push-push type memory card connector according to claim 11, wherein the locking member comprises a retaining portion fixed to the slider and a spring arm extending from the retaining portion, the spring arm comprising a hook protruding into the card receiving cavity for locking the memory card.

14. The push-push type memory card connector according to claim 13, wherein the protrusion extends upwardly from the retaining portion.

15. The push-push type memory card connector according to claim 13, wherein the retaining portion is U-shaped and comprises opposite first and second sides, the spring arm extending from the first side with the protrusion disposed between the first side and the spring arm.

16. The push-push type memory card connector according to claim 15, wherein the dimple protrudes towards the second side of the retaining portion.

17. The push-push type memory card connector according to claim 11, wherein the arced surface of the dimple is located between the first and the second edges and is spaced apart from the first and the second edges.

18. A memory card connector, comprising:

an insulative housing defining a card receiving cavity for insertion of a memory card;

a plurality of contacts retained in the insulative housing with contact portions protruding into the card receiving cavity;

a metallic shell attached to the housing to cover the card receiving cavity and defining a slit along a card mating direction;

a card eject mechanism comprising a slider back and forth moveable along a card insertion direction, and a locking member fixed to the slider, the locking member deflectable in a transverse direction perpendicular to said card mating direction, and equipped with a protrusion extending in a vertical direction perpendicular to both said card mating direction and said transverse direction to be received in said slit; wherein at least one of said protrusion and said slit is equipped with an arc structure so as to result in less friction between then protrusion and the shell during back and forth movement of said locking member in said card mating direction.

* * * * *